(12) United States Patent
Yen et al.

(10) Patent No.: US 8,605,137 B2
(45) Date of Patent: Dec. 10, 2013

(54) STEREOSCOPIC IMAGE DISPLAY HAVING PARTICULAR OPTICAL GRATING

(75) Inventors: Wei-Ting Yen, Taipei (TW); Chi-Lin Wu, Taipei County (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 655 days.

(21) Appl. No.: 12/877,997

(22) Filed: Sep. 8, 2010

(65) Prior Publication Data

US 2011/0096070 A1    Apr. 28, 2011

Related U.S. Application Data

(63) Continuation-in-part of application No. 12/846,831, filed on Jul. 30, 2010.

(60) Provisional application No. 61/254,106, filed on Oct. 22, 2009.

(51) Int. Cl.
*H04N 15/00* (2006.01)
*H04N 13/04* (2006.01)

(52) U.S. Cl.
USPC ............................................... 348/51

(58) Field of Classification Search
None
See application file for complete search history.

(56) References Cited

U.S. PATENT DOCUMENTS

| 6,064,424 | A | 5/2000 | van Berkel et al. |
| 7,268,943 | B2 * | 9/2007 | Lee ................................ 359/464 |
| 7,317,494 | B2 | 1/2008 | Mashitani et al. |
| 2005/0073577 | A1 * | 4/2005 | Sudo et al. ....................... 348/51 |
| 2007/0236792 | A1 * | 10/2007 | Mashitani ..................... 359/462 |
| 2008/0079662 | A1 | 4/2008 | Saishu et al. |
| 2008/0117233 | A1 * | 5/2008 | Mather et al. ................. 345/690 |
| 2008/0165296 | A1 * | 7/2008 | Kim et al. ......................... 349/15 |
| 2008/0316379 | A1 | 12/2008 | Zuidema et al. |

FOREIGN PATENT DOCUMENTS

| CN | 1595226 | 3/2005 |
| CN | 1619358 | 5/2005 |

* cited by examiner

*Primary Examiner* — Joseph Ustaris
*Assistant Examiner* — Kevin McInnish
(74) *Attorney, Agent, or Firm* — Jianq Chyun IP Office

(57) ABSTRACT

A stereoscopic image display including an image displaying unit and an optical grating is provided. The image displaying unit has a black matrix and pixels surround by the black matrix, and each pixel has a width P in a first direction. The optical grating is disposed corresponding to the image displaying unit, wherein the optical grating comprises a plurality of constitutional groups arranged in the first direction. Each of constitutional groups comprises a plurality of slits having the same width W to expose the corresponding pixels, the width P of pixel and the width W of slit satisfy a specific relationship, so as to reduce the morie phenomenon and provide excellent stereo image quality.

15 Claims, 13 Drawing Sheets

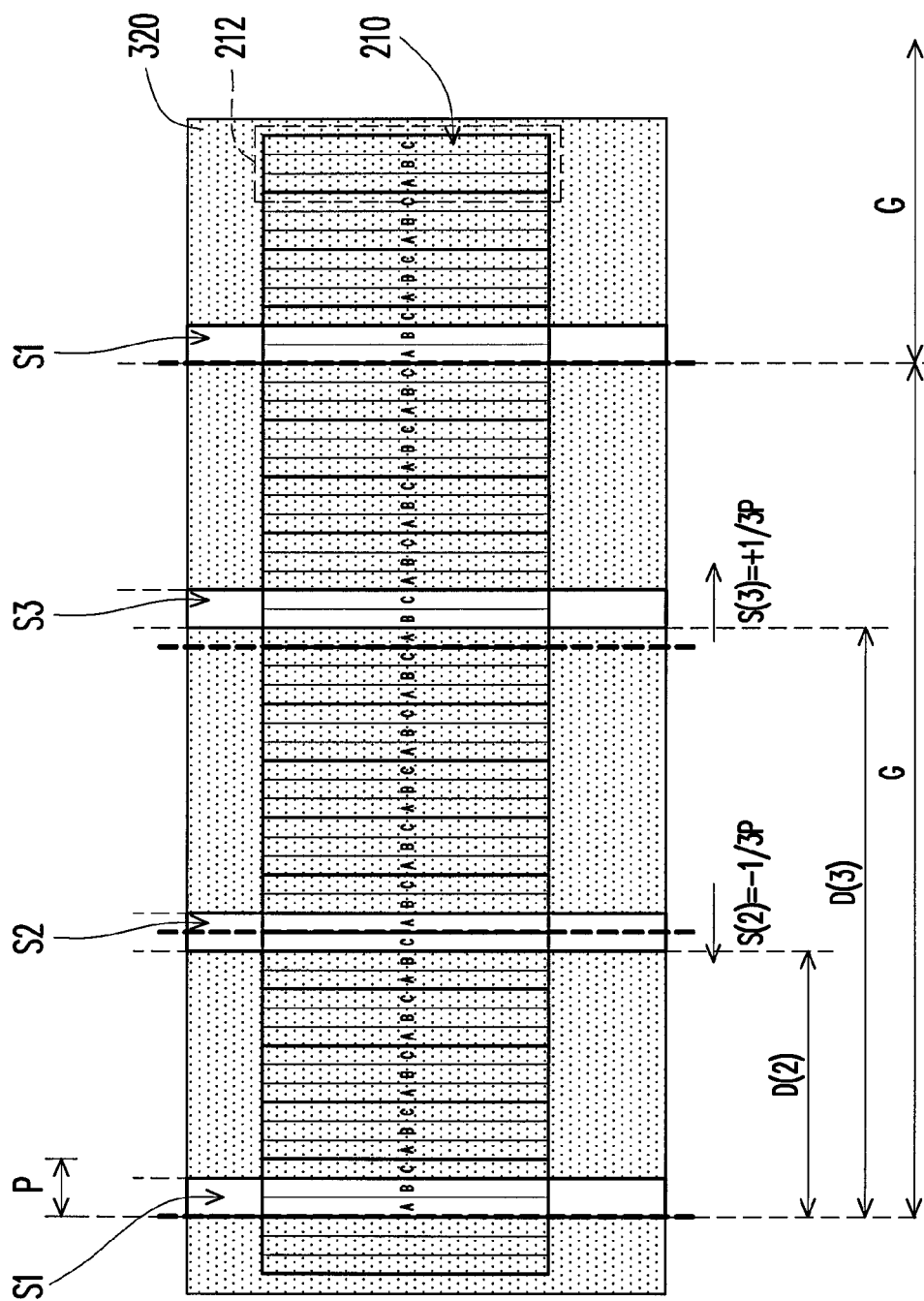

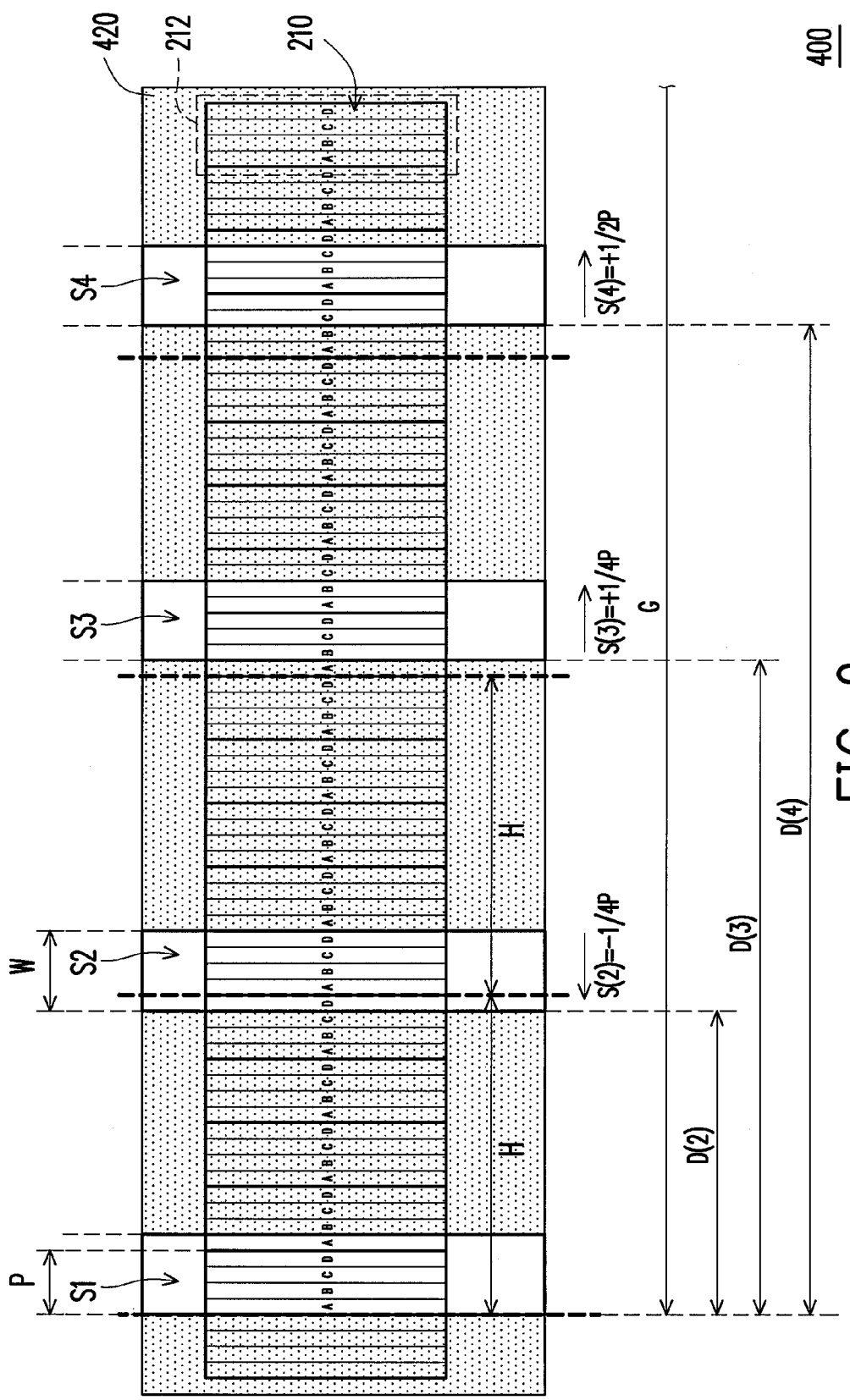

STEREOSCOPIC IMAGE DISPLAY HAVING PARTICULAR OPTICAL GRATING

CROSS-REFERENCE TO RELATED APPLICATION

This application is a continuation-in-part of and claims the priority benefit of U.S. application Ser. No. 12/846,831, filed on Jul. 30, 2010, which claims the priority benefit of U.S. provisional application Ser. No. 61/254,106, filed on Oct. 22, 2009. The entirety of each of the above-mentioned patent applications is hereby incorporated by reference herein and made a part of this specification.

TECHNICAL FIELD

The disclosure relates to a display apparatus, and more particularly to a stereoscopic image display.

BACKGROUND

In recent years, continuous advancement of display technologies results in increasing demands on display quality of displays, such as image resolution, color saturation, and so on. Nevertheless, in process of purchasing a display, whether the display is able to display 3D images or not is also taken into consideration in addition to high image quality.

Typically, there are many types of technologies for forming a 3D image with naked eyes, such as the holographic type technology, the multi-plane technology and the parallax-image technology. The parallax-image technology uses the spatial-multiplexed three-dimensional display technology as the major application technology. In the spatial-multiplexed three-dimensional display technology, the lenticular or the parallax barrier is used to form the viewing zones for the right eye and the left eye of the viewer in order to establish the stereo image effect. In addition, the parallax barrier has advantages of easily fabricating and cheap cost.

In detail, according to visual characteristics of human eyes, a 3D image may be produced when two images with the same content but different parallax are respectively captured by a viewer's left and right eyes.

In current 3D image display technologies, a spatial-multiplexed technology is mainly utilized for controlling images captured in respective eyes of a viewer. For example, U.S. Pat. No. 6,064,424 has disclosed a spatial-multiplexed technology utilized by a lenticular, and U.S. Pat. No. 7,317,494 has disclosed another spatial-multiplexed technology utilized by a parallax barrier. However, a problem of image irregularities such as moire is existed in the stereoscopic image display of related art, wherein the moire phenomenon is shown as FIG. 1.

SUMMARY

A stereoscopic image display including an image displaying unit and an optical grating is provided. The image displaying unit comprises a black matrix and a plurality of pixels surround by the black matrix, wherein the pixels are arranged in an array. The optical grating is disposed corresponding to the image displaying unit, wherein the optical grating comprises a plurality of constitutional groups repeating arranged along a first direction. Each of constitutional groups comprises a plurality of slits having the same width, and the first direction is one of the arranging direction of the pixies.

A stereoscopic image display including an image displaying unit and an optical grating is provided. The image displaying unit comprises a black matrix and a plurality of pixels surround by the black matrix, wherein the pixels are arranged in an array, and each pixel has a width P along a first direction. The optical grating is disposed corresponding to the image displaying unit, wherein the optical grating comprises a plurality of constitutional groups arranged along the first direction. Each of constitutional groups comprises a plurality of slits having the same width W to expose the corresponding pixels. The width P of pixel and the width W of slit satisfy the following formula (1):

$$W = \frac{m}{n} \times P, m, n \in N, \text{ and } m \neq n. \tag{1}$$

Each constitutional group comprises n slits, and a distance $D(n)$ of $(n)^{th}$ slit from the first slit in the same constitutional group satisfies the following formula (2):

$$D(n) = (n-1) \times H + S(n) \tag{2}$$

In formula (2), H represents a hypothetical interval, $S(n)$ represents a shift distance of $(n)^{th}$ slit in one constitutional group, $S(n)$ satisfies formula (3) when n is even, and $S(n)$ satisfies formula (4) when n is odd:

$$S(1), S(2), \ldots, S(n-1), \tag{3}$$
$$S(n) = \left(0, +1, -1, \ldots, \frac{n-2}{2}, \frac{2-n}{2}, \pm\frac{n}{2}\right) \times \frac{P}{n};$$

$$S(1), S(2), \ldots, S(n-1), \tag{4}$$
$$S(n) = \left(0, +1, -1, \ldots, \frac{n-3}{2}, \frac{3-n}{2}, \frac{n-1}{2}, \frac{1-n}{2}\right) \times \frac{P}{n},$$

in formula (3) and formula (4), symbols + and − represents right shift and left shift, respectively.

A stereoscopic image display including an image displaying unit and an optical grating is provided. The image displaying unit comprising a black matrix and a plurality of pixels surround by the black matrix, wherein the pixels are arranged in an array, and each pixel has a width P along a first direction. The optical grating disposed corresponding to the image displaying unit, wherein the optical grating comprises a plurality of constitutional groups repeating arranged along the first direction. Each of constitutional groups comprises a plurality of slits having the same width W, and the width P of pixel and the width W of slit satisfy the formula (6):

$$W \bmod P = 0 \tag{6}$$

in formula (6), mod represents modulo operation.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 8A is a schematic view of an optical grating and a displaying image unit in the stereoscopic image display according to another embodiment of the disclosure.

FIG. 9 is a schematic view of an optical grating and a displaying image unit in the stereoscopic image display according to another embodiment of the disclosure.

DETAILED DESCRIPTION OF DISCLOSED EMBODIMENTS

In the present disclosure, a new stereoscopic image display technique is accomplished by equipping an optical grating with constitutional groups, wherein each constitutional groups has a plurality of slits having the same width W to expose the corresponding pixels of the image displaying unit. By controlling the arrangement of slits in the constitutional groups according to the relationship between the pixel width P and the slit width W, the morie phenomenon is effectively reduced and the stereo image quality is effectively improved. Embodiments of the disclosure will be described below. However, these embodiments are not intended for limiting the scope of the invention. Besides, some of the embodiments may be combined appropriately to produce other different embodiments of the disclosure.

Figure 1:
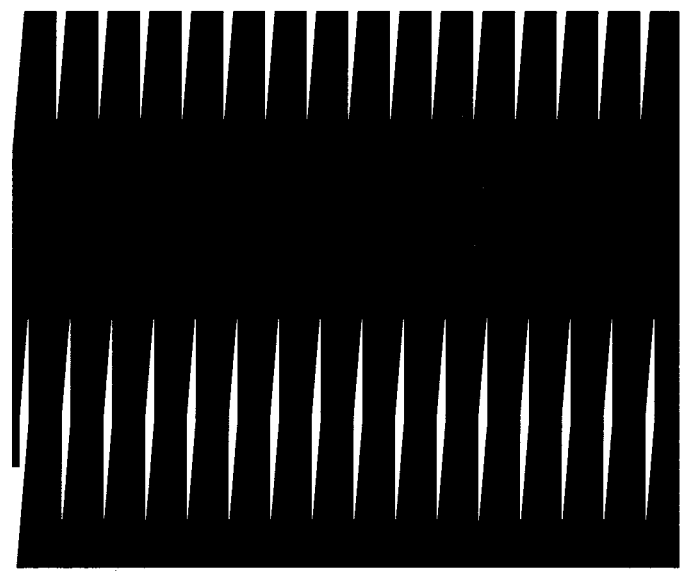
FIG. 1 is a schematic morie phenomenon of a conventional stereoscopic image display.
Figure 2:
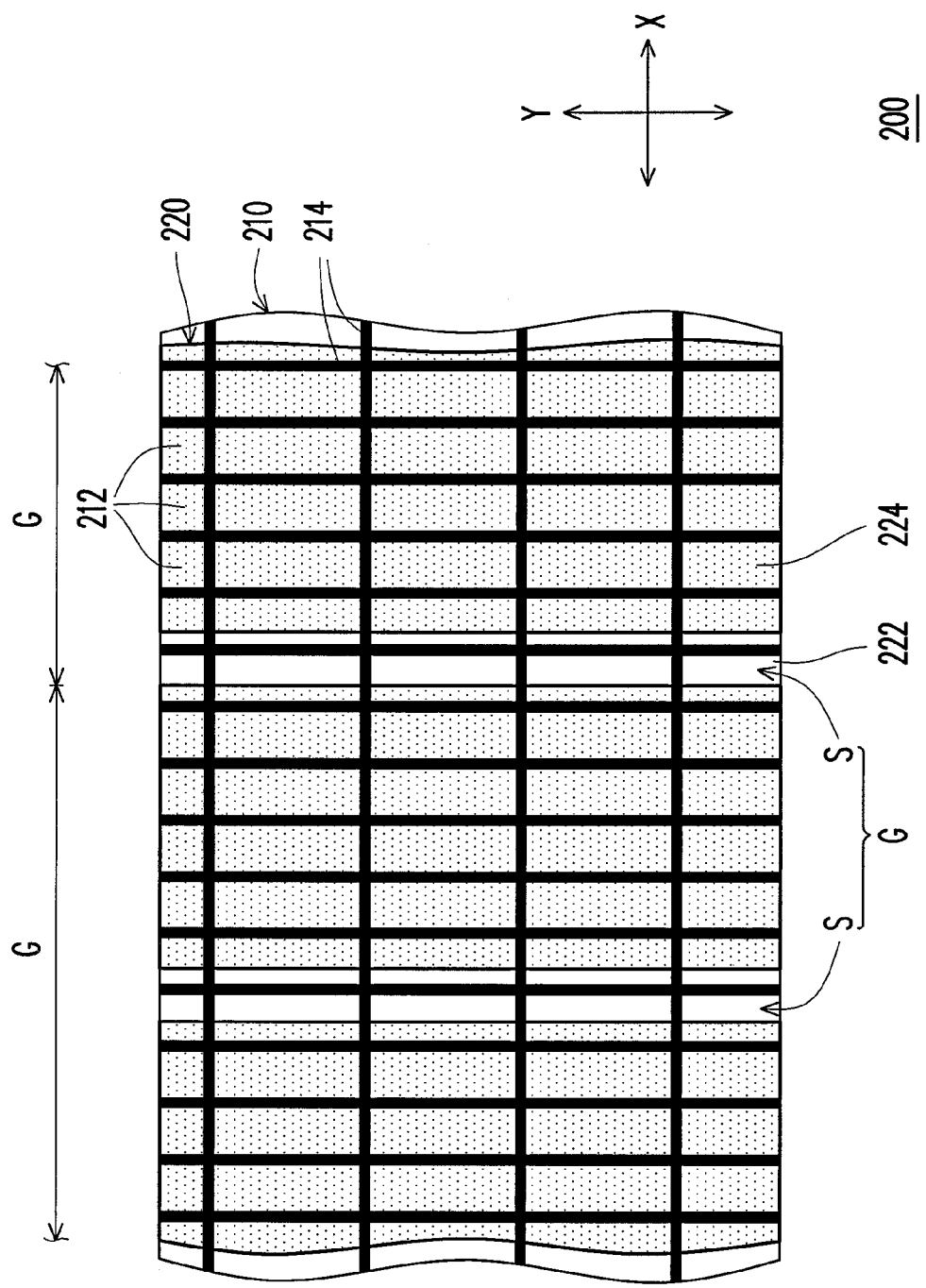
FIG. 2 is a schematic front views of stereoscopic image display according to one embodiment of the disclosure.

FIG. 2 is a schematic front views of stereoscopic image display according to one embodiment of the disclosure. Referring to FIG. 2, a stereoscopic image display 200 of the present embodiment includes an image displaying unit 210 and an optical grating 220. The image displaying unit 210 comprises a plurality of pixels 212 and a black matrix 214, wherein the pixels is suitable for displaying an image and the pixels 212 are surround and defined by the black matrix 214 along the first direction X and the second direction Y, so that the pixels 212 are arranged in an array with first direction X and second direction Y. In this embodiment, the width of each pixel is P.

As shown in FIG. 2, the optical grating 220 is disposed corresponding to the image displaying unit 210. The optical grating 220 comprises a plurality of constitutional groups G repeating arranged along a first direction X, and each of constitutional groups G comprises a plurality of slits S having the same width W. More specifically, the optical grating 220 comprises a light transmission region 222 and a light shielding region 224. Herein, the position of those slits S constitutes the light transmission region 222 of the optical grating 220, and other regions of the optical grating 220 excluding slits S constitutes the light shielding region 224. The slits S of the optical grating 220 are used to expose the corresponding pixels of the image displaying unit 210, so as to form the viewing zones for the right eye and the left eye of the viewer in order to establish the stereo image effect.

The optical grating 220 is able to reduce the brightness variation while viewer changes his viewing position. In some embodiments, the relationship between the pixel width P and the slit width W is considered, and adjust the arrangement of slits in the constitutional groups of the optical grating to satisfy a specific relationship, so as to solve the morie phenomenon and provide excellent stereo image quality. The detail structure of the constitutional groups G and the detail arrangement of slits in one constitutional groups G will be described in the following.

The stereoscopic image display 200 of the present embodiment includes an image displaying unit 210 and an optical grating 220, wherein the image displaying unit 210 may be a liquid crystal display panel, an organic light emitting diode display, or any other image displaying unit suitable for display images, the present invention is not limited the types of image displaying unit 210. Moreover, the optical grating 220 may be disposed in front of the image displaying unit 210 or disposed rear of the image displaying unit 210. Take the liquid crystal display panel as the image displaying unit for example.

Figure 3A:
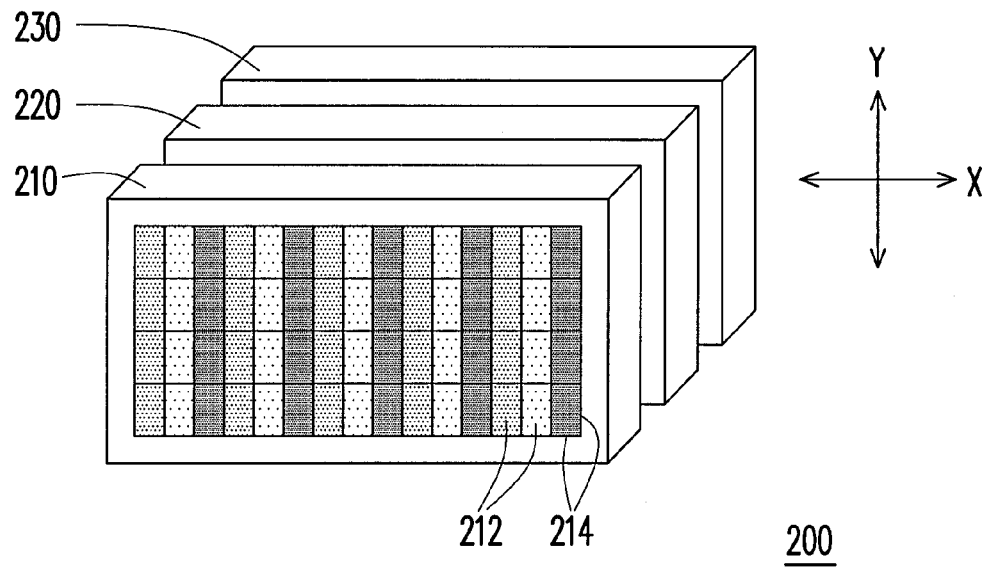
FIG. 3A and FIG. 3B are schematic front views of stereoscopic image display according to the one embodiment of the disclosure.
Figure 3B:
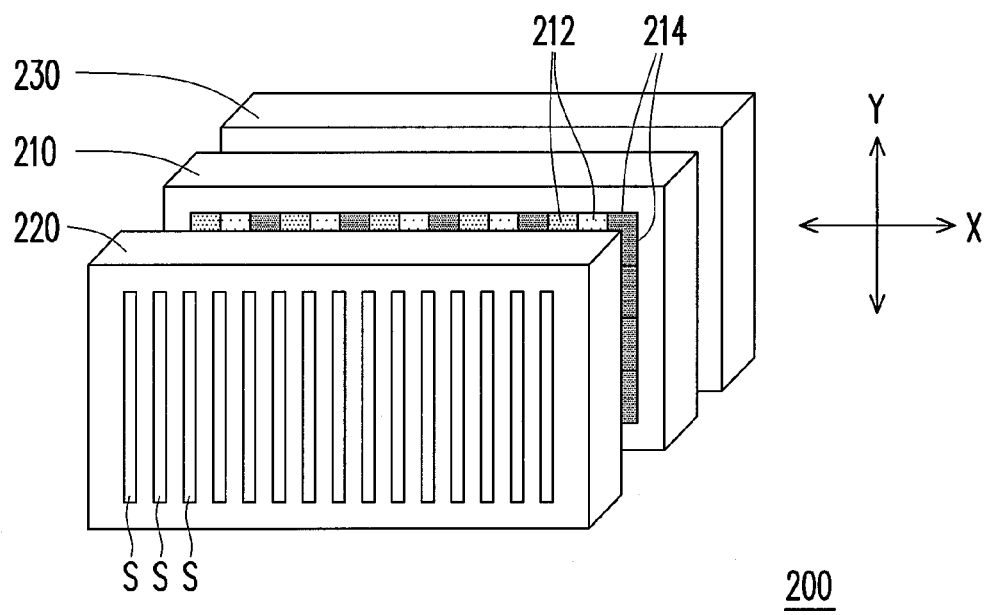

FIG. 3A and FIG. 3B are schematic front views of stereoscopic image display according to the one embodiment of the disclosure. Referring to FIG. 3A, the stereoscopic image display 200 of the present embodiment includes an image displaying unit 210 and an optical grating 220. The stereoscopic image display 200 of the present embodiment may further include a backlight module 230. As shown in FIG. 3A, the optical grating 220 is disposed the rear of the image displaying unit 210, in other words, the optical grating 220 in this embodiment is disposed between the image displaying unit 210 and the backlight module 230. On the other hand, referring to FIG. 3B, the optical grating 220 is disposed in front of the image displaying unit 210, in other words, the image displaying unit 210 may also dispose between the optical grating 220 and the backlight module 230.

Figure 4:
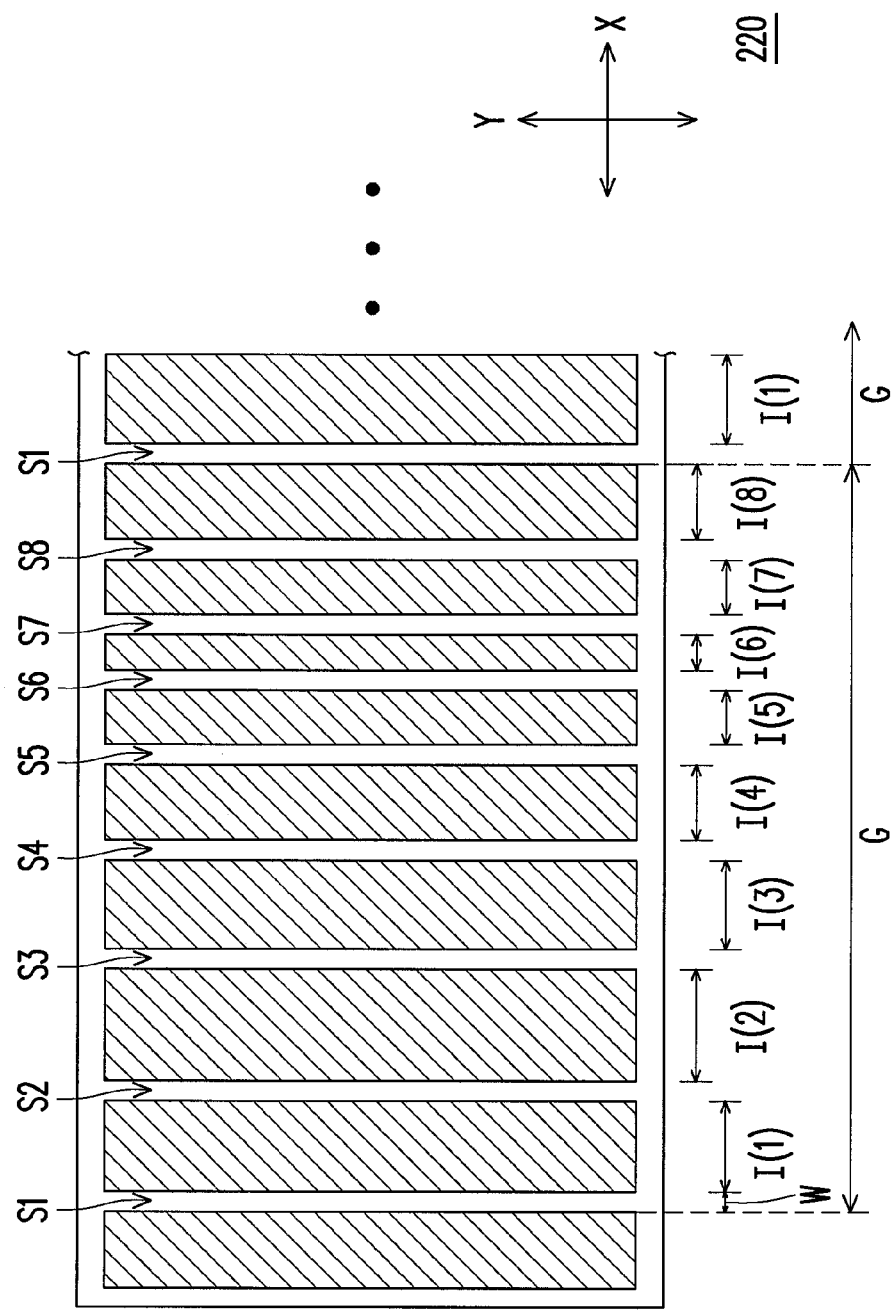
FIG. 4 is a schematic front view of an optical grating in the stereoscopic image display according to one embodiment of the disclosure.

The optical grating 220 has a plurality of slit S is able to reduce the brightness variation while viewer changes his viewing position. More specifically, FIG. 4 is a schematic front view of an optical grating in the stereoscopic image display according to one embodiment of the disclosure. Referring to FIG. 4, the optical grating 220 includes a plurality of constitutional groups G repeating arranged in a first direction X, which is one of the arranging direction of the pixels as shown in FIG. 2. Each of constitutional groups G includes a plurality of slits having the same width W, such as slits S1 to S8. The shielding intervals I(1) to I(8) between two adjacent slits may be varied in this present embodiment, in other words, the optical grating 220 in the present embodiment has multi-interval constitutional group. It should be noted that the shielding intervals I(1) to I(8) between two adjacent slits in one constitutional group G may be the same in other embodiment (not shown). By arranging the slits of the repeating constitutional group G, the morie phenomenon can be effectively reduced while the viewer changes his viewing positions.

Figure 5:
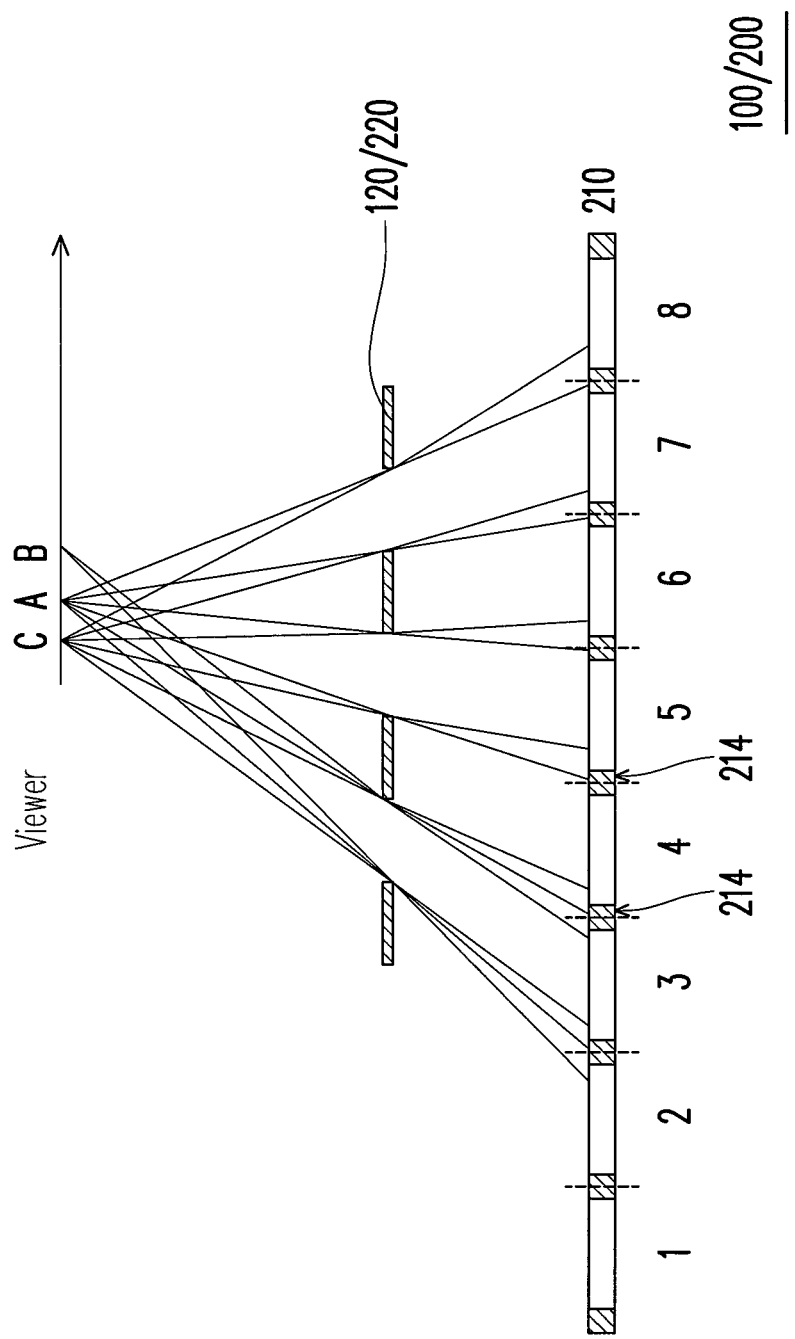
FIG. 5 is an explanatory view showing the principle of a stereoscopic image display which allows viewers to view in different viewing positions.

For better illustration, the stereoscopic image display as shown in FIG. 5 is taken as an example to describe the principle to reduce moire phenomenon, so that the basic concept of the following embodiments for reducing moire phenomenon could be easily understood. However, the embodiments in the follows are not limit the present invention.

Figure 6A:
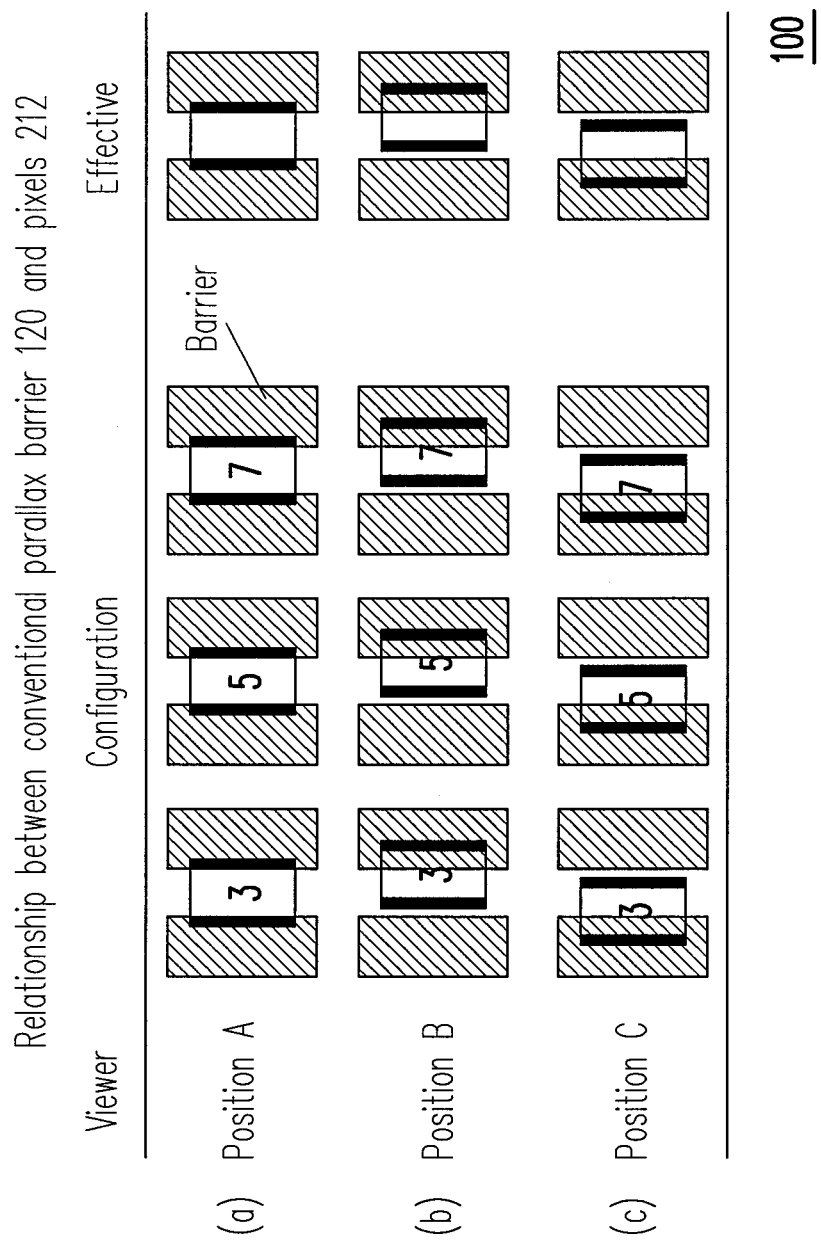
FIG. 6A is an explanatory view showing the relationship between an array of pixels of the image displaying unit and a slit on the conventional parallax barrier in different viewing positions

FIG. 5 is an explanatory view showing the principle of a stereoscopic image display which allows viewers to view in different viewing positions, wherein the optical grating shown in FIG. 5 may signify the conventional parallax barrier 120 or the optical grating 220 illustrating in the preceding embodiments. FIG. 6A is an explanatory view showing the relationship between an array of pixels of the image displaying unit and a slit on the conventional parallax barrier 120 in different viewing positions, and FIG. 6B is an explanatory view showing the relationship between an array of pixels of the image displaying unit 210 and a slit on the optical grating 220 illustrating in the preceding embodiments in different viewing positions, herein, the optical grating 220 is a parallax barrier having constitutional group structures with different intervals of slits therein in this embodiment.

Referring to FIG. 5 and FIG. 6A, since the conventional parallax barrier 120 of the conventional stereoscopic image display 100 is not properly designed to fit the specific formula as the embodiments of the disclosure according to the relationship between the pixel width and the slit width, when the viewer changes his viewing positions, such as position A, position B and position C shown in FIG. 5, the brightness of image displaying by the pixels and passing through the slits are varied. As such, the morie phenomenon is easily produced while the viewer changes his viewing positions. In detail, when the viewer views stereoscopic image display 100 at viewing position A, the light from pixels 3, 5, 7 is given to the eyes of the viewer through the corresponding slits of the parallax barrier, and a state where light from the whole pixels is given as shown in (a) row and Effective column of FIG. 6A, which the total effective viewing frame is normal without shift. When the viewer views the stereoscopic image display 100 at viewing position B, the light from pixels 3, 5, 7 given to the eyes of the viewer through the corresponding slits of the parallax barrier is right-shift opposite to the corresponding slits, and a state where light from the whole pixels is given as shown in (b) row and Effective column of FIG. 6A, which the total effective viewing frame is right-shift. As such, the viewer could not view the whole image displayed by the image display unit and also view a dark region due to a portion of black matrix on the left side of the pixels 3, 5, 7. Accordingly, the coexistence of the bright region displayed by pixels 3, 5, 7 and the dark region of black matrix on the left side of the pixels 3, 5, 7 makes the viewer to feel moire. Likewise, when the viewer views the stereoscopic image display 100 at viewing position C, the light from pixels 3, 5, 7 given to the eyes of the viewer through the corresponding slits of the parallax barrier is left-shift opposite to the corresponding slits, and a state where light from the whole pixels is given as shown in (c) row and Effective column of FIG. 6A, which shows the total effective viewing frame being left-shift. As such, since the viewer could not view the whole image displayed by the image display unit and also view a dark region due to a portion of black matrix on the right side of the pixels 3, 5, 7, the brightness of images displaying by pixel and passing through the slits are varied. Accordingly, the coexistence of the bright region displayed by pixels 3, 5, 7 and the dark region of black matrix on the right side of the pixels 3, 5, 7 makes the viewer to feel moire.

Figure 6B:
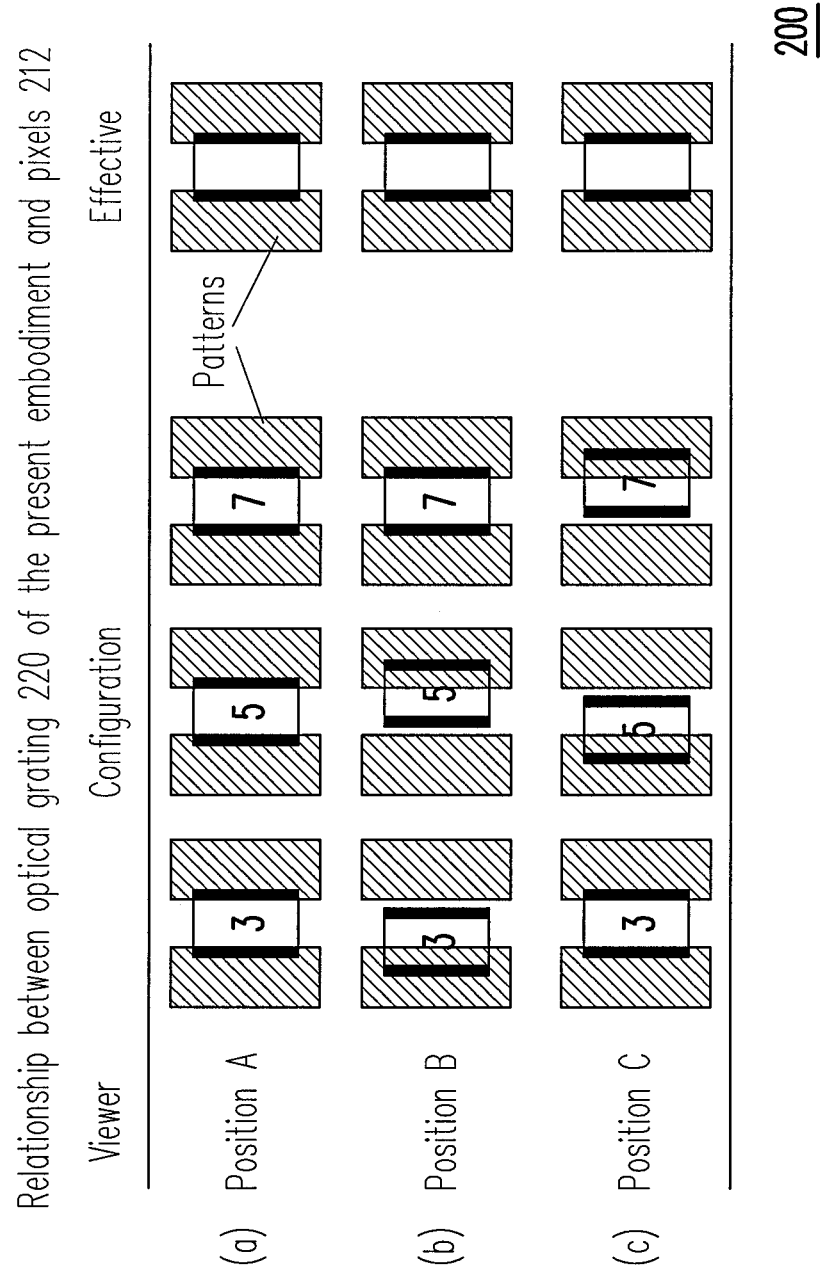
FIG. 6B is an explanatory view showing the relationship between an array of pixels of the image displaying unit and a slit on the optical grating illustrating in the preceding embodiments in different viewing positions.

On the other hand, referring to FIG. 5 and FIG. 6B, since optical grating 220 of the stereoscopic image display 200 in the present embodiment has multiple-interval constitutional groups as the proceeding embodiments in FIG. 4, the morie phenomenon can be effectively reduced while the viewer changes his viewing positions, such as position A, position B and position C shown in FIG. 5. As the forementioned description, a state where light from the whole pixels is given as shown in (a) row and Effective of FIG. 6B when the viewer views the stereoscopic image display 200 at viewing position A, and the total effective viewing frame is normal without shift. Moreover, when the viewer views the stereoscopic image display 200 at viewing position B, although the light from pixels 3, 5, 7 each given to the eyes of the viewer through the corresponding slits of the parallax barrier is shifted opposite to the corresponding slits, the total effective viewing frame keeps normal due to the shielding interval of the slits in the constitutional group G are carefully considered to satisfy specific relationships. More specifically, the light from pixel 3 given to the eyes of the viewer through the corresponding slits of the parallax barrier is left-shift opposite to the corresponding slits, the light from pixel 5 given to the eyes of the viewer through the corresponding slits of the parallax barrier is right-shift opposite to the corresponding slits, and the light from pixel 7 given to the eyes of the viewer through the corresponding slits of the parallax barrier is substantially not shifted. By this way, the light from pixels 3, 5, 7 given to the eyes of the viewer through the corresponding slits of the parallax barrier are compensated from each other, so that the total effective viewing frame is normal without shift. Consequently, since the bright region displayed by pixels 3, 5, 7 and the dark region due to the black matrix of shifted pixels are blurred, the moire phenomenon can be effectively reduced. In the same manner, when the viewer views the stereoscopic image display 200 at viewing position C, although the light from pixels 3, 5, 7 each given to the eyes of the viewer through the corresponding slits of the parallax barrier is shifted opposite to the corresponding slits, the total effective viewing frame keeps normal due to the widths of the patterns in the constitutional group G are periodically changed. For the same reason, the light from pixels 3, 5, 7 each given to the eyes of the viewer through the corresponding slits of the parallax barrier is respectively substantially not shifted, left-shift, and right-shift in sequence, which are compensated to each other, so that the total effective viewing frame is normal without shift. Accordingly, since the bright region displayed by pixels 3, 5, 7 and the dark region due to the black matrix of shifted pixels are blurred, the moire phenomenon can be effectively reduced.

As such, the viewer may not sense the variation of brightness even when the viewer changes his viewing position. Some Embodiments of the disclosure will be described below. However, these embodiments are not intended for limiting the scope of the invention. Besides, some of the embodiments may be combined appropriately to produce other different embodiments of the disclosure.

Figure 7:
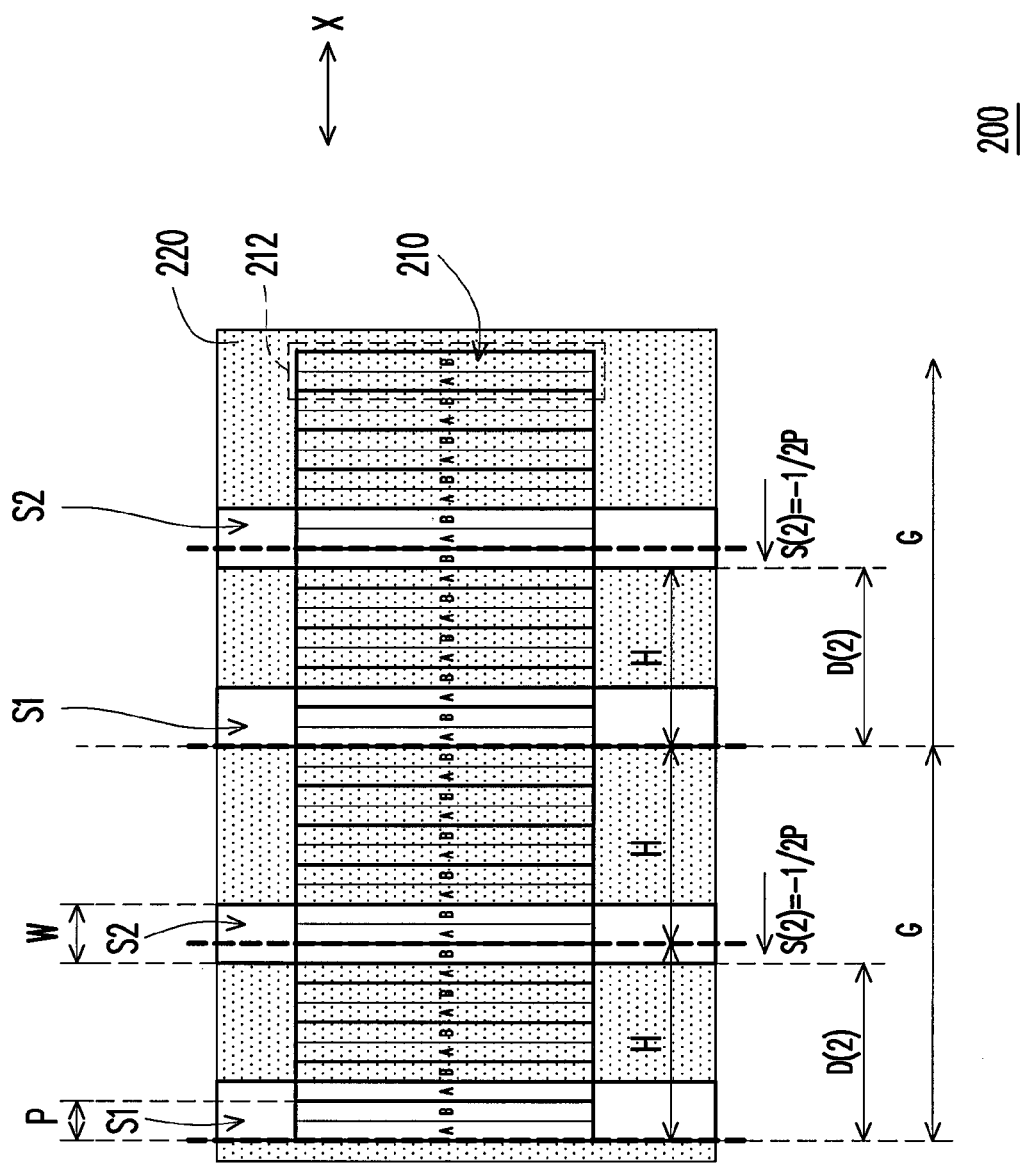
FIG. 7 is a schematic view of an optical grating and a displaying image unit in the stereoscopic image display according to one embodiment of the disclosure.

FIG. 7 is a schematic view of an optical grating and a displaying image unit in the stereoscopic image display according to one embodiment of the disclosure. Referring to FIG. 7, in the first direction X, each pixel 212 has a width P and each slit S has a width W. In this embodiment, the width P of pixel is not equal to the width W of slit, and shielding intervals between two adjacent slits in same constitutional group are varied along the first direction X. The width P of pixel can be greater than or smaller than the width W of slit.

More specifically, the width P of pixel and the width W of slit satisfy the formula (1):

$$W = \frac{m}{n} \times P, m, n \in N, \text{ and } m \neq n. \quad (1)$$

In formula (1), m>n or m<n. The designer could design the arrangement of the slits S in the optical grating 220 including the numbers of slits S in one constitutional group G and the positions of slits S in one constitutional group G according to the relationship between pixel width P and slit width W represented by formula (1). In detail, when the pixel width P and slit width W satisfy the above formula (1), one constitutional group can be divided into n slits, that is, the numbers of slits in one constitutional group is n.

Moreover, the positions of slits S in one constitutional group G satisfies the following formula (2):

$$D(n)=(n-1)\times H+S(n) \quad (2)$$

In formula (2), D(n) represents the distance of nth slit from the first slit in the same constitutional group, and H represents a hypothetical interval, wherein H may choose a proper value according to a viewing distance between the viewer and the stereoscopic image display and a disposing distance between the optical grating and the image displaying unit. Besides, S(n) in formula (2) represents a shift distance of nth slit in one constitutional group, wherein S(n) satisfies formula (3) when n is even, and S(n) satisfies formula (4) when n is odd:

$$S(1), S(2), \ldots, S(n-1), \quad (3)$$
$$S(n) = \left(0, +1, -1, \ldots, \frac{n-2}{2}, \frac{2-n}{2}, \pm\frac{n}{2}\right) \times \frac{P}{n};$$

$$S(1), S(2), \ldots, S(n-1), \quad (4)$$
$$S(n) = \left(0, +1, -1, \ldots, \frac{n-3}{2}, \frac{3-n}{2}, \frac{n-1}{2}, \frac{1-n}{2}\right) \times \frac{P}{n}$$

In formula (3) and formula (4), symbols + and − represent different shift directions from a predeterminate position. For instance, symbols + represents right shift and symbols + represents left shift. More specifically, P/n is defined as one shift unit in the embodiment, and the predeterminate position is an integer multiple of the hypothetical interval H according to S(n). For example, the predeterminate position of $n^{th}$ slit in one constitutional group G can be calculated by (n−1)×H, and thus the position of $n^{th}$ slit in one constitutional group G is its predeterminate position plus a shift distance, which is represented as the above formula (2), It should be notice that the shift distances S(n) of slits, such as S(1) to S(n), in the same constitutional group can be interchanged.

Furthermore, the width P of pixel and the width W of slit satisfy the formula (5) in this embodiment:

$$\max(m,n) \bmod \min(m,n)=1 \quad (5)$$

In formula (5), mod represents modulo operation. More specifically, the modulo operation finds the remainder of division of one number by another. As such, the "max(m, n) mod min(m, n)=1" of formula (5) represents the remainder of division of the maximum value between m and n by the minimum value between m and n is 1. For instance, either in the case of $$W = \frac{3}{2} \times P$$

or in the case of $$W = \frac{2}{3} \times P,$$

they all satisfy the relationships of the above formula (5).

Referring to FIG. 7, in this embodiment, the width W of slit and the width P of pixel satisfy the relationship of $$W = \frac{3}{2} \times P,$$

wherein the width W of slit in the present embodiment is greater than the width P of pixel. Hence, according to the above description, each constitutional group G comprises 2 slits, such as S1 and S2. Besides, the hypothetical interval H is designed according to the viewer's viewing distance, and in this embodiment, the hypothetical interval H is taken 5P as an example. Since n is even in this embodiment, according to the above-mentioned formula (3), the shift distance S(1) of the first slit S1 in one constitutional group is 0, and the shift distance S(2) of the second slit S2 in the same constitutional group can be calculated as following:

$$\left(\pm\frac{n}{2}\right) \times \frac{P}{n} = \left(\pm\frac{2}{2}\right) \times \frac{P}{2} = \pm\frac{P}{2}$$

That means, the shift distance S(2) of the second slit S2 can be chosen either $$\frac{P}{n},$$

which is right shift, or $$-\frac{1}{2}P,$$

which is left shift. In this embodiment, the shift distance S(2) of the second slit S2 is represented as $$-\frac{1}{2}P.$$

It should be notice that the shift distances S(n) of slits, such as S(1) to S(n), in the same constitutional group can be interchanged. For example, since the numbers of slits in one constitutional group is 2, the value of shift distance S(1) can also be interchanged with the value of shift distance S(2).

Moreover, taken the left side of the first slit S1 as the origin of the coordinate, and according to the above-mentioned formula (2), the distance D(2) of second slit S2 from the first slit S1 in the same constitutional group G is $$4\frac{1}{2}P.$$

For better illustration, the stereoscopic image display as shown in FIG. 7 is taken as an example to describe the principle to reduce moire phenomenon, so that the basic concept of the following embodiments for reducing moire phenomenon could be easily understood. However, the embodiments in the follows are not limit the present invention.

Referring to FIG. 7, since one shift unit is $$\frac{P}{2},$$

each pixel 212 can be divided into 2 equal parts as A and B. The first slit S1 exposes 2 parts of A and 1 part of B, and the second slit S2 exposes 1 part of A and 2 parts of B. Therefore, 3 parts of A and 3 parts of B are exposed by the slits S1 and S2 in one constitutional group. Assuming the viewer changing his viewing positions, and a relative displacement is formed between the slits and exposed pixels. In this case, assuming the slits are right shift related to the pixels for 1 shift unit $$\frac{P}{2},$$

the first slit S1 after shifted exposes 1 parts of A and 2 part of B, and the second slit S2 exposes 2 part of A and 1 parts of B. Accordingly, the slits S1 and S2 after shifted in one constitutional group still expose 3 parts of A and 3 parts of B, the total brightness sening by the viewer remains substantially the same. By this way, the images from pixels exposed by slits given to the eyes of the viewer through the corresponding slits of the parallax barrier are compensated from each other in the same constitutional group, so that the total effective viewing frame is normal without shift, the moiré phenomenon can be effectively reduced.

As such, by arranging the numbers and the positions of slits in the constitutional group satisfying the above formulas according to the relationship between the pixel size and slit size satisfying formula (1), while a viewer changing his viewing position along the first direction, even though a relative displacement is formed between the slits and exposed pixels, the total aperture ratio of pixels exposed by the slits in one constitutional group remain fixed, and thus the viewer would not sense morie.

For better illustration, other arrangements of slits in the same constitutional group G, some embodiments are taken as examples to describe the numbers of slits and the disposing positions of slits in the same constitutional group G, but the embodiments in the follows are not limit the present invention.

FIG. 8A is a schematic view of an optical grating and a displaying image unit in the stereoscopic image display according to another embodiment of the disclosure, wherein the stereoscopic image display 300 in present embodiment is similar to the stereoscopic image display 200 as shown in FIG. 7 except the width and the arrangement of slits in each constitutional group G of the optical grating 420.

Referring to FIG. 8A, the width W of slit and the width P of pixel in this embodiment satisfy the relationship of $$W = \frac{2}{3} \times P,$$

wherein the width W of slit in the present embodiment is smaller than the width P of pixel 212. In addition, according to the above description, each constitutional group G comprises 3 slits since n is 3 in this embodiment, such as S1, S2 and S3. Besides, the hypothetical interval is taken 5P as an example. Since n is odd in this embodiment, according to the above-mentioned formula (4), the shift distance S(1) of the first slit S1 in one constitutional group is 0, and the shift distance S(2) of the second slit S2 and the shift distance S(3) of the third slit S3 in the same constitutional group can be calculated as following:

$$\left(\pm\frac{n-1}{2}\right) \times \frac{P}{n} = \left(\pm\frac{3-1}{2}\right) \times \frac{P}{3} = \pm\frac{P}{3}$$

Therefore, the shift distance S(2) of the second slit S2 and the shift distance S(3) of the third slit S3 can be $$+\frac{1}{3}P, -\frac{1}{3}P$$

in sequence or $$-\frac{1}{3}P, +\frac{1}{3}P$$

in sequence. In this embodiment, the shift distance S(2) and S(3) are represented as $$-\frac{1}{3}P, +\frac{1}{3}P$$

respectively. In addition, the shift distances S(n) of slits, such as S(1) to S(n), in the same constitutional group can be interchanged. For example, in this embodiment, since the numbers of slits in one constitutional group is 3, the values of shift distance S(1), shift distance S(2), and shift distance S(3) can also be interchanged to one another.

Moreover, taken the left side of the first slit S1 as the origin of the coordinate, and according to the above-mentioned formula (2), the distance D(2) of second slit S2 from the first slit S1 in the same constitutional group G is $$4\frac{2}{3}P,$$

and distance D(3) of third slit S3 from the first slit S1 in the same constitutional group G is $$10\frac{1}{3}P.$$

Referring to FIG. 8A, since one shift unit is $$\frac{P}{3},$$

each pixel 212 can be divided into 3 equal parts as A, B and C. The first slit S1 exposes 1 parts of A and 1 part of B, the second slit S2 exposes 1 part of A and 1 parts of C, and the third slit S3 exposes 1 part of B and 1 parts of C. Therefore, 2 parts of A, 2 parts of B and 2 parts of C are exposed by the slits S1, S2 and S3 in one constitutional group in this embodiment. Like the analysis of the embodiment shown in FIG. 7, when the viewer changing his viewing positions, assuming the slits are right shift related to the pixels for 1 shift unit $$\frac{P}{3},$$

the first slit S1 after shifted will expose 1 parts of B and 1 part of C, the second slit S2 will expose 1 part of A and 1 parts of B, and the third slit S3 will expose 1 part of A and 1 parts of C. Accordingly, the slits S1, S2 and S3 after shifted in one constitutional group still expose 2 parts of A, 2 parts of B and 2 parts of C, the total brightness sening by the viewer remains substantially the same. By this way, the images from pixels exposed by slits given to the eyes of the viewer through the corresponding slits of the parallax barrier are compensated from each other in the same constitutional group, so that the total effective viewing frame is normal without shift, the moiré phenomenon can be effectively reduced.

As such, by arranging the numbers and the positions of slits in the constitutional group satisfying the above formulas according to the relationship between the pixel size and slit size satisfying formula (1), while a viewer changing his viewing position along the first direction, even though a relative displacement is formed between the slits and exposed pixels, the total aperture ratio of pixels exposed by the slits in one constitutional group remain fixed, and thus the viewer would not sense morie.

Figure 8B:
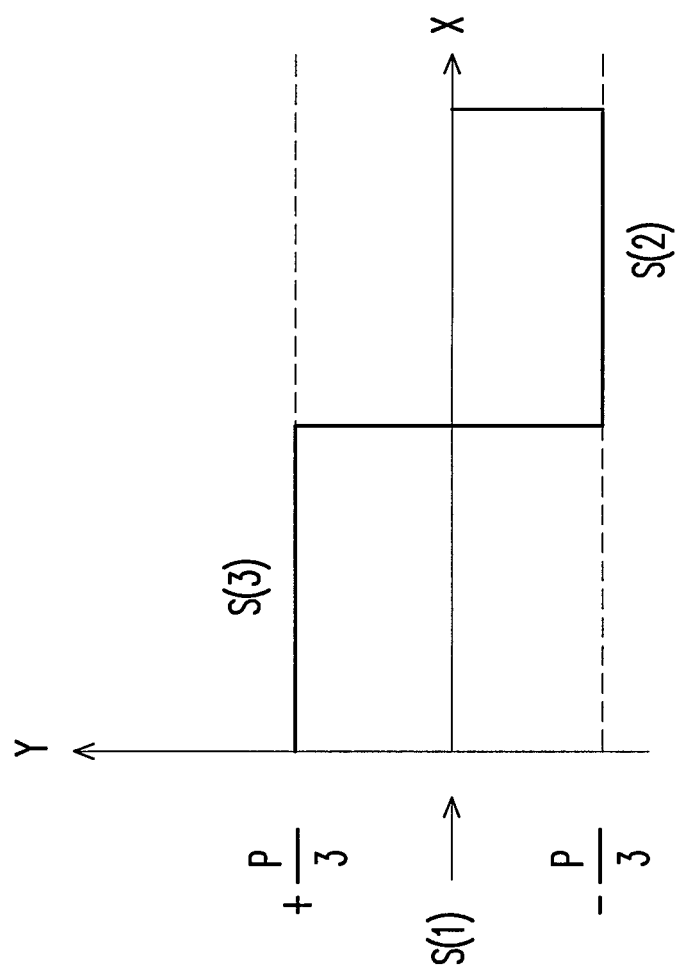
FIG. 8B illustrates a relationship between shift distances of slits in a constitutional group of FIG. 8A of a stereoscopic image display according to the present embodiment of the disclosure.

FIG. 8B illustrates a relationship between shift distances of slits in a constitutional group of FIG. 8A of a stereoscopic image display according to the present embodiment of the disclosure. Referring to FIG. 8A and FIG. 8B, in the optical grating of this embodiment, take the shift distance S(1) of the first slit S1 as central distance, and a shift distances S(2) of the second slit S2 and S(3) of the third slit S3 related to the central distance in same constitutional group G is defined as an additional distance as shown in FIG. 8B. The amplitude of distance vibration within the same constitutional group G is one shift unit $$\frac{P}{n},$$

and the cycle within the same constitutional group ranges from slits S1 to S3. Herein, the amplitude of distance vibration within the same constitutional group G in this embodiment is $$\frac{P}{3}.$$

As shown in FIG. 8B, the distances of the slits S1 to S3 in one constitutional group G along the positions satisfy a function of square wave.

FIG. 9 is a schematic view of an optical grating and a displaying image unit in the stereoscopic image display according to another embodiment of the disclosure, wherein the stereoscopic image display 400 in present embodiment is similar to the stereoscopic image display 200 as shown in FIG. 7 except the width and the arrangement of slits in each constitutional group G of the optical grating 320.

More specifically, the width W of slit and the width P of pixel in this embodiment satisfy the relationship of $$W = \frac{5}{4} \times P,$$

wherein the width W of slit in the present embodiment is greater than width P of pixel 212. In addition, according to the above description, each constitutional group G comprises 4 slits since n is 4 in this embodiment, such as S1, S2, S3 and S4. Besides, the hypothetical interval is taken 5P as an example. Since n is even in this embodiment, according to the above-mentioned formula (3), the shift distance S(1) of the first slit S1 in one constitutional group is 0, and the shift distance S(2) of the second slit S2 and the shift distance S(3) of the third slit S3 in the same constitutional group can be calculated as following:

$$\left(\pm\frac{n-2}{2}\right) \times \frac{P}{n} = \left(\pm\frac{4-2}{2}\right) \times \frac{P}{4} = \pm\frac{P}{4}$$

That means, the shift distance S(2) of the second slit S2 and the shift distance S(3) of the third slit S3 can be $$+\frac{1}{4}P, -\frac{1}{4}P$$

in sequence or $$-\frac{1}{4}P, +\frac{1}{4}P$$

in sequence. In this embodiment, the shift distance S(2) and S(3) are represented as $$-\frac{1}{4}P, +\frac{1}{4}P,$$

respectively. In addition, the shift distance S(4) of the fourth slit S4 in the same constitutional group can be calculated as following:

$$\left(\pm\frac{n}{2}\right) \times \frac{P}{n} = \left(\pm\frac{4}{2}\right) \times \frac{P}{4} = \pm\frac{P}{2}$$

That means, the shift distance S(4) of the fourth slit S4 can be chosen either $$\frac{P}{2},$$

which is right shift, or $$-\frac{1}{2}P,$$

which is left shift. In this embodiment, the shift distance S(4) of the fourth slit S4 is represented as $$+\frac{1}{2}P.$$

In addition, the shift distances S(n) of slits, such as S(1) to S(n), in the same constitutional group can be interchanged. For example, in this embodiment, since the numbers of slits in one constitutional group is 4, the values of shift distance S(1), shift distance S(2), shift distance S(3) and shift distance S(4) can also be interchanged to one another.

Moreover, taken the left side of the first slit S1 as the origin of the coordinate, and according to the above-mentioned formula (2), the distance D(2) of second slit S2 from the first slit S1 in the same constitutional group G is $$4\frac{3}{4}P,$$

the distance D(3) of third slit S3 from the first slit S1 in the same constitutional group G is $$10\frac{1}{4}P,$$

and distance D(4) of fourth slit S4 from the first slit S1 in the same constitutional group G is $$15\frac{1}{2}P.$$

Referring to FIG. 9, since one shift unit is $$\frac{P}{4},$$

each pixel 212 can be divided into 4 equal parts as A, B,C and D. The first slit S1 exposes 2 parts of A, 1 part of B and C and D, the second slit S2 exposes 2 parts of D and 1 part of A and B and C, the third slit S3 exposes 2 parts of B and 1 part of A and C and D, and the fourth slit S4 exposes 2 parts of C and 1 part of A and B and D. Therefore, 5 parts of A and B and C and D are exposed by the slits S1, S2, S3 and S4 in one constitutional group in this embodiment. Like the analysis of the embodiments shown in FIGS. 7 and 8A, when the viewer changing his viewing positions, assuming the slits are right shift related to the pixels for 1 shift unit $$\frac{P}{4},$$

the first slit S1 after shifted will expose 2 parts of B and 1 part of A and C and D, the second slit S2 will expose 2 parts of A and 1 part of B and C and D, the third slit S3 will expose 2 parts of C and 1 part of A and B and D, and the fourth slit S4 will expose 2 parts of D and 1 part of A and B and C. Accordingly, the slits 51, S2, S3 and S4 after shifted in one constitutional group still expose 5 parts of A, 2 parts of B and 2 parts of C, the total brightness sening by the viewer remains substantially the same. By this way, the images from pixels exposed by slits given to the eyes of the viewer through the corresponding slits of the parallax barrier are compensated from each other in the same constitutional group, so that the total effective viewing frame is normal without shift, the moiré phenomenon can be effectively reduced.

As such, by arranging the numbers and the positions of slits in the constitutional group satisfying the above formulas according to the relationship between the pixel size and slit size satisfying formula (1), while a viewer changing his viewing position along the first direction, even though a relative displacement is formed between the slits and exposed pixels, the total aperture ratio of pixels exposed by the slits in one constitutional group remain fixed, and thus the viewer would not sense morie.

Figure 10:
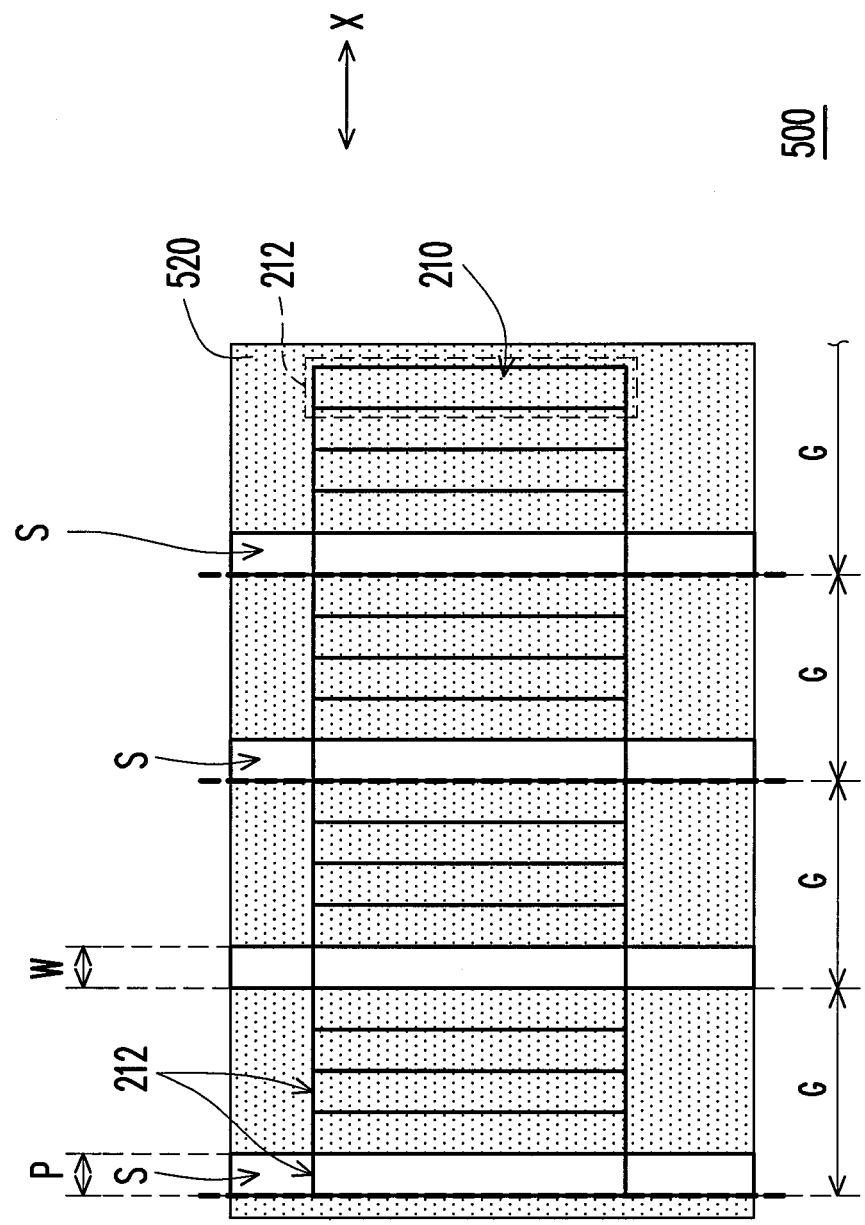
FIG. 10 is a schematic view of an optical grating and a displaying image unit in the stereoscopic image display according to another embodiment of the disclosure.

FIG. 10 is a schematic view of an optical grating and a displaying image unit in the stereoscopic image display according to another embodiment of the disclosure. The stereoscopic image display 500 has an optical grating 520 and an image displaying unit 210. Each pixel has a width P along the first direction, and each slit in one constitutional group has a width W in the first direction. In this embodiment, the width P of pixel is substantially equal to the width W of slit.

More specifically, the optical grating 520 is disposed corresponding to the image displaying unit 210. the optical grating 520 comprises a plurality of constitutional groups G repeating arranged along the first direction, each of constitutional groups G comprises at least one slit having the same width W, and the width P of pixel and the width W of slit satisfy the formula (6):

$$W \bmod P = 0 \tag{6}$$

in formula (6), mod represents modulo operation. In other words, the width P of pixel is equal to the width W of slit in this embodiment. In other embodiments, the width W of slit can be an integer multiple of the width P of pixel.

As such, by designing the width P of pixel and the width W of slit through satisfying the formula (6), even though a relative displacement is formed between the slits and exposed pixels while a viewer changing his viewing position along the first direction, the total aperture ratio of pixels exposed by the slits of the optical grating remain fixed, and thus the viewer would not sense morie.

Figure 11:
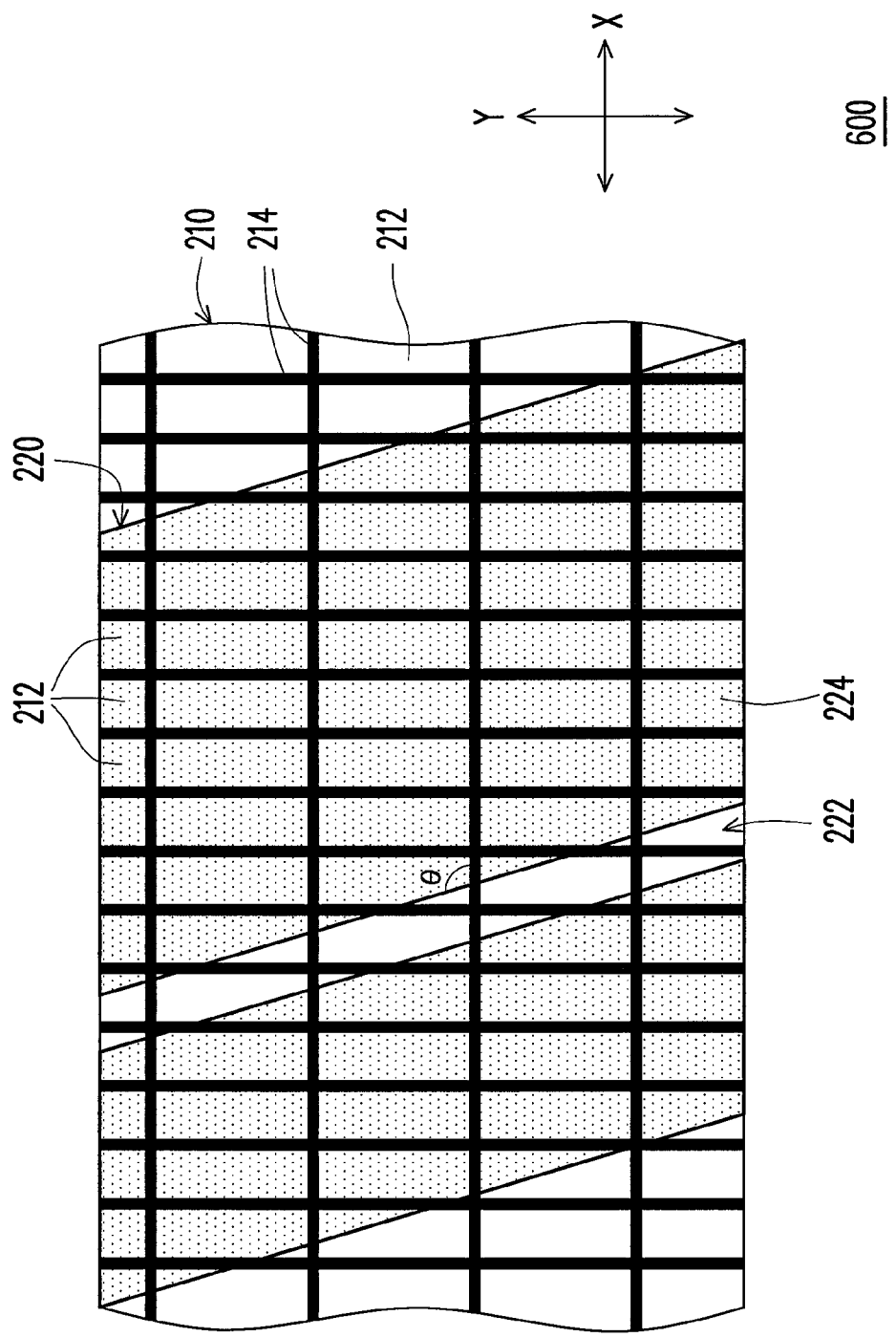
FIG. 11 is a schematic cross-sectional view of another stereoscopic image display according to one embodiment of the disclosure.

It should be noted that in the above-mentioned embodiment, the repeating direction of the constitutional groups G and the plurality of slits S are substantially along the first direction X, such that the length extending direction of each slit S are substantially along the direction of the second direction Y, in other words, the length extending direction of each slit S is parallel to one side of the black matrix. Certainly, the slits S of optical grating 620 may also be arranged along a direction which is not parallel to the direction of one side of black matrix, as shown in FIG. 11. Referring to FIG. 11, the slits S' of the optical grating 620 are slanted-shaped, rather than bar-shaped as the preceeding embodiments, in other words, length extending direction of each slit S forms an included angle θ excluding 90° with a column direction Y of the pixels, and the light shielding region 224 is substantially parallelogram shape. As such, the total resolution of the three-dimensional images display by the stereoscopic image display is substantially maintained. That is, compare to the stereoscopic image display shown in FIG. 2, the stereoscopic image display shown in FIG. 11 may gain a higher resolution in the horizontal direction.

The directional terminology, such as "top," "bottom," "front," "back," "left," "right," etc., in this disclosure is used with reference to the orientation of the Figure(s) being described. In general, apparatus of embodiments can have different orientation, and the above terminologies are merely used to described the related position. For example, in FIG. 3A, the optical grating 220 can be described as being disposed the rear of the image displaying unit 210. As such, the directional terminology is used for purposes of illustration and is in no way limiting.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereoscopic image display, comprising:
   an image displaying unit comprising a black matrix and a plurality of pixels surround by the black matrix, wherein the pixels are arranged in an array; and
   an optical grating disposed corresponding to the image displaying unit, wherein the optical grating comprises a plurality of constitutional groups repeating arranged along a first direction, each of constitutional groups comprises at least one slit having the same width, and the first direction is one of the arranging direction of the pixels
   wherein each of constitutional groups comprises a plurality of slits, two adjacent slits in same constitutional group has a shielding interval, each pixel has a width P in the first direction, each slit has a width W in the first direction, the width P of pixel is not equal to the width W of slit, and shielding intervals between two adjacent slits in same constitutional group are varied along the first direction, and
   wherein the width P of pixel and the width W of slit satisfy formula (1):

$$W = \frac{m}{n} \times P, m, n \in N, \text{ and } m \neq n, \qquad (1)$$

each constitutional group comprises n slits, and a distance $D(n)$ of $(n)^{th}$ slit from the first slit in the same constitutional group satisfies formula (2):

$$D(n) = (n-1) \times H + S(n) \qquad (2)$$

in formula (2), H represents a hypothetical interval, $S(n)$ represents a shift distance of $(n)^{th}$ slit in one constitutional group, $S(n)$ satisfies formula (3) when n is even, and $S(n)$ satisfies formula (4) when n is odd:

$$S(1), S(2), \ldots, S(n-1), \qquad (3)$$
$$S(n) = \left(0, +1, -1, \ldots, \frac{n-2}{2}, \frac{2-n}{2}, \pm\frac{n}{2}\right) \times \frac{P}{n};$$

$$S(1), S(2), \ldots, S(n-1), \qquad (4)$$
$$S(n) = \left(0, +1, -1, \ldots, \frac{n-3}{2}, \frac{3-n}{2}, \frac{n-1}{2}, \frac{1-n}{2}\right) \times \frac{P}{n},$$

in formula (3) and formula (4), symbols + and − represent right shift and left shift, respectively.

2. The stereoscopic image display as claimed in claim 1, wherein the width P of pixel and the width W of slit satisfy formula (5):

$$\max(m,n) \bmod \min(m,n) = 1, \qquad (5)$$

in formula (5), mod represents modulo operation.

3. The stereoscopic image display as claimed in claim 1, wherein each pixel has a width P in the first direction, the slit in one constitutional group has a width W in the first direction, and the width P of pixel is equal to the width W of slit.

4. The stereoscopic image display as claimed in claim 1, wherein a length extending direction of the slit in one constitutional group is parallel to a horizontal direction of the black matrix.

5. The stereoscopic image display as claimed in claim 1, wherein the slits are slanted slits, and a length extending direction of the slit in one constitutional group forms an included angle excluding 90° with a column direction of the pixels.

6. The stereoscopic image display as claimed in claim 1, wherein the optical grating is disposed in front of the image displaying unit or disposed rear of the image displaying unit.

7. A stereoscopic image display, comprising:
   an image displaying unit comprising a black matrix and a plurality of pixels surround by the black matrix, wherein the pixels are arranged in an array, and each pixel has a width P along a first direction; and
   an optical grating disposed corresponding to the image displaying unit, wherein the optical grating comprises a plurality of constitutional groups arranged along the first direction, each of constitutional groups comprises a plurality of slits having the same width W to expose the corresponding pixels, the width P of pixel and the width W of slit satisfy formula (1):

$$W = \frac{m}{n} \times P, m, n \in N, \text{ and } m \neq n \qquad (1)$$

each constitutional group comprises n slits, and a distance $D(n)$ of $(n)^{th}$ slit from the first slit in the same constitutional group satisfies formula (2):

$$D(n) = (n-1) \times H + S(n) \qquad (2)$$

in formula (2), H represents a hypothetical interval, $S(n)$ represents a shift distance of $(n)^{th}$ slit in one constitutional group, $S(n)$ satisfies formula (3) when n is even, and $S(n)$ satisfies formula (4) when n is odd:

$$S(1), S(2), \ldots, S(n-1), \qquad (3)$$
$$S(n) = \left(0, +1, -1, \ldots, \frac{n-2}{2}, \frac{2-n}{2}, \pm\frac{n}{2}\right) \times \frac{P}{n};$$

$$S(1), S(2), \ldots, S(n-1), \qquad (4)$$
$$S(n) = \left(0, +1, -1, \ldots, \frac{n-3}{2}, \frac{3-n}{2}, \frac{n-1}{2}, \frac{1-n}{2}\right) \times \frac{P}{n},$$

in formula (3) and formula (4), symbols + and − represent right shift and left shift, respectively.

8. The stereoscopic image display as claimed in claim 7, wherein the width P of pixel and the width W of slit satisfy the formula (5):

$$\max(m,n) \bmod \min(m,n) = 1, \qquad (5)$$

in formula (5), mod represents modulo operation.

9. The stereoscopic image display as claimed in claim 7, wherein the constitutional groups are arranged repeatedly along the first direction.

10. The stereoscopic image display as claimed in claim 9, wherein the width W of slit and the width P of pixel satisfy:

$$W = \frac{3}{2} \times P,$$

each constitutional group comprises 2 slits, the hypothetical interval is 5P, the shift distance S(2) of the second slit in one constitutional group is $$-\frac{1}{2}P,$$

and the distance D(2) of second slit from the first slit in the same constitutional group is $$4\frac{1}{2}P.$$

11. The stereoscopic image display as claimed in claim 9, wherein the width W of slit and the width P of pixel satisfy:

$$W = \frac{2}{3} \times P,$$

each constitutional group comprises 3 slits, the hypothetical interval is 5P, the shift distances S(2) and S(3) in one constitutional group are $$-\frac{1}{3}P \text{ and } +\frac{1}{3}P,$$

respsectively, and the distances D(2) and D(3) in the constitutional group are $$4\frac{2}{3}P \text{ and } 10\frac{1}{3}P,$$

respectivley.

12. The stereoscopic image display as claimed in claim 9, wherein the width W of slit and the width P of pixel satisfy:

$$W = \frac{5}{4} \times P,$$

each constitutional group comprises 4 slits, the hypothetical interval is 5P, the shift distances S(1), S(2), S(3) and S(4) in one constitutional group are $$-\frac{1}{4}P, +\frac{1}{4}P, +\frac{1}{2}P \text{ or } -\frac{1}{2}P,$$

respectively, and the distances D(2), D(3) and D(4) in the constitutional group are $$4\frac{3}{4}P, 10\frac{1}{4}P, 15\frac{1}{2}P,$$

respectively.

13. The stereoscopic image display as claimed in claim 7, wherein the optical grating has at least two type of the constitutional groups, a slit arrangement of one type of the constitutional groups is different from that of the other type of the constitutional groups.

14. The stereoscopic image display as claimed in claim 7, wherein a total aperture ratio of pixels exposed by the slits of one constitutional group keeps fixed while a relative displacement is formed between the slits and exposed pixels causing by a viewer changing his viewing position along the first direction.

15. The stereoscopic image display as claimed in claim 7, wherein the slits are slanted slits, and a length extending direction of each slit forms an included angle excluding 90° with a column direction of the pixels.

\* \* \* \* \*